W. CHAFFIN.
SIGNAL.
APPLICATION FILED JUNE 11, 1915.
1,239,668.
Patented Sept. 11, 1917.
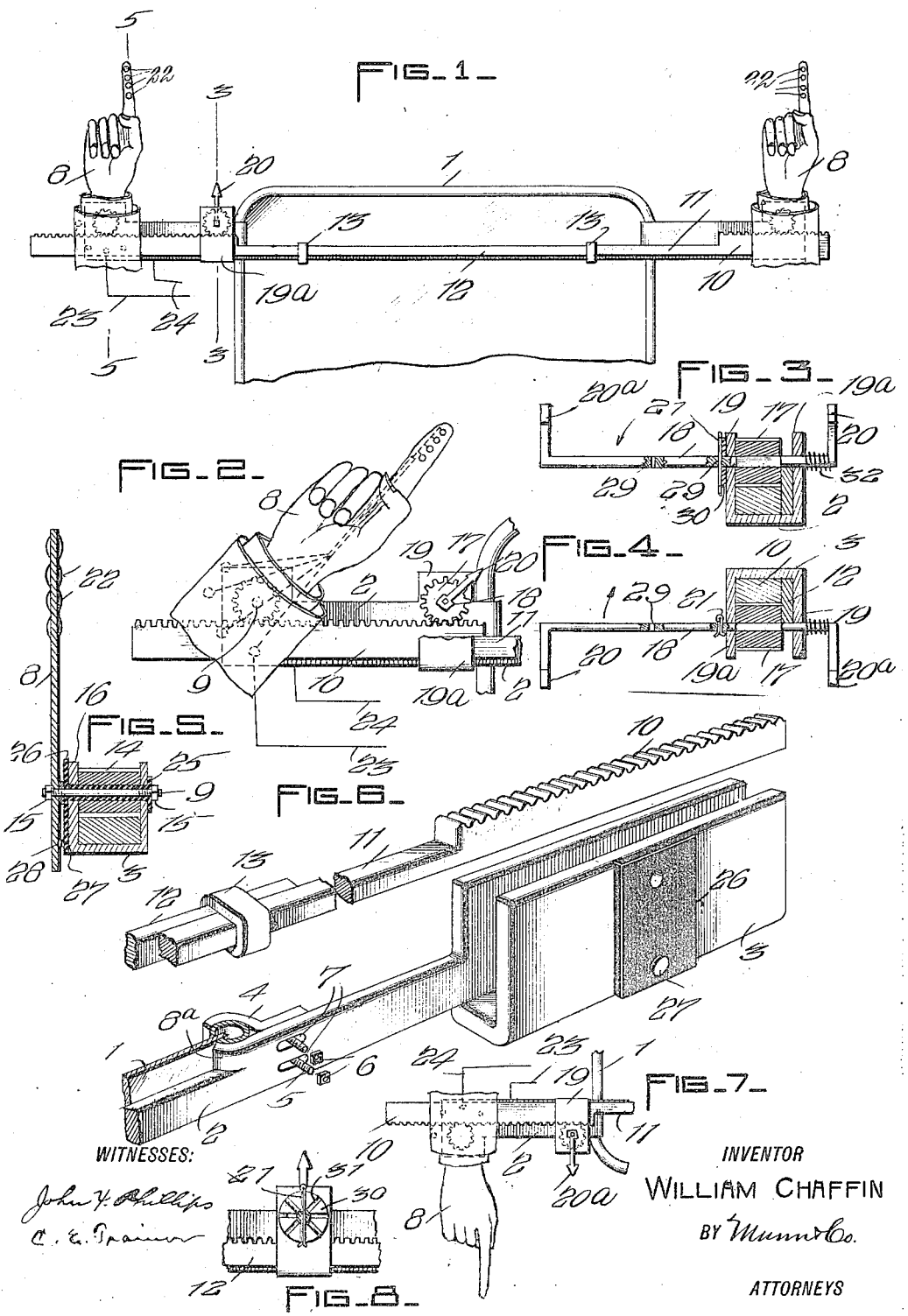
WITNESSES:
John Y. Phillips
C. E. Trainor
INVENTOR
WILLIAM CHAFFIN
BY Munn & Co.
ATTORNEYS

UNITED STATES PATENT OFFICE.

WILLIAM CHAFFIN, OF SAN ANTONIO, TEXAS.

SIGNAL.

1,239,668.  Specification of Letters Patent.  Patented Sept. 11, 1917.

Application filed June 11, 1915. Serial No. 33,497.

*To all whom it may concern:*

Be it known that I, WILLIAM CHAFFIN, a citizen of the United States, and a resident of San Antonio, in the county of Bexar and State of Texas, have invented a new and useful Improvement in Signals, of which the following is a specification.

My invention is an improvement in signals, and the invention has for its object to provide mechanism of the character specified, especially adapted for use in connection with motor vehicles for indicating to crossing policemen, drivers, and like persons, the intention of the driver of the vehicle to which the signal is connected as regards turning, going straight ahead or stopping, backing, or the like, and wherein the mechanism is so arranged that it may be connected to any vehicle without change in the vehicle, and wherein the signaling mechanism may be operated by the driver from his seat.

In the drawings:—

Figure 1 is a front view of the signal and its operating mechanism in place,

Fig. 2 is an enlarged detail sectional view of one of the indicators,

Fig. 3 is a section on the line 3—3 of Fig. 1,

Fig. 4 is a view similar to Fig. 3, showing the parts in another position,

Fig. 5 is a section on the line 5—5 of Fig. 1,

Fig. 6 is a perspective view of one of the rack bars,

Fig. 7 is a partial front view showing the indicating mechanism used with the wind shield turned down, and Fig. 8 is a rear view of a holding mechanism for the indicators.

The present embodiment of the invention is shown in connection with the wind shield 1 of an automobile, and the improvement comprises a bar 2, having at each end a channel-shaped or U-shaped portion 3. The bar is also provided on the inner side of each channel-shaped portion with a sectional clamp for engaging the adjacent end of the frame of the wind shield.

This clamp comprises a detachable section 4, which is connected to the bar by means of bolts 5 and nuts 6. The detachable portion 4 of the clamp has openings which register with slots 7 in the bar, and the bolts are passed through the openings and the slots and are engaged by the nuts to secure the detachable section to the bar. That portion of the bar between the U-shaped portion 3 and the body of the bar is of greater width than the body of the bar, and at the inner end of the widened portion the bar has a curved lug $8^a$, which coöperates with the curved inner end of the detachable portion 4 to embrace the metallic frame of the wind shield.

The wind shield is of usual construction, consisting of a sheet of glass held in a metallic frame and the frame is rounded as shown or circular in cross section. When the nuts 6 are tightened on the bolts with the parts in the position of Fig. 6, the frame of the wind shield will be clamped at each side to the bar.

A plurality of indicators is provided, the said indicators in the present instance being plates 8, each cut to the shape of a hand, with the index finger extended. These plates 8 are arranged at the opposite ends of the bar, being pivoted to the U-shaped portions 3 of the bar on a pivot pin or bolt 9.

A rack bar is arranged at each end of the bar 2, each of the rack bars 10 having a plain extension 11 at its inner end, which is lapped upon the adjacent end of a connecting bar 12, and is held thereto by means of a clip 13. Each clip 13 encircles the lapping ends of the connecting bar 12, and the extensions 11, to connect the rack bars to the connecting bar rigidly, so that all will move together.

Each of the rack bars has its teeth upward, and the teeth of each bar mesh with the pinion 14 on the shaft or bolt 9, which connects the indicator 8 to the U-shaped portion 3 of the supporting bar 2. As will be seen from an inspection of Fig. 5, each of the bolts 9 is threaded at its opposite ends, and the said ends are engaged by nuts 15.

An insulating sleeve 16 encircles the bolt within the adjacent pinion, and the sleeves are extended beyond the ends of the pinions to insulate the bolt 9 from the U-shaped portion 3 of the bar 2. It will be evident that when the rack bars are moved longitudinally of the bar 1 by mechanism to be presently described, the indicators 8 will be simultaneously swung in the same direction.

The bar 2 is moved by means of a pinion 17, which is secured to a shaft 18, journaled in openings in an extension of the bar 2, adjacent to the indicator 8, which will be at the right hand of the driver. This extension comprises a portion 19 at the top of the enlargement of the bar 2, and a portion 19$^a$ at the bottom of the bar, and the said portion 19$^a$ is bent outwardly and upwardly to lie in front of the rack bar 10 and the pinions 18, as shown in Figs. 3 and 4, and indicators 20 and 20$^a$ in the form of arrows are secured to each end of the shaft 18.

One of the indications 20 is at the outer face of the portion 19$^a$ of the extension and the other indicator 20$^a$ is at the inner end of the shaft, and the said shaft is of a length to hold the indicator just mentioned in position to be grasped by the driver to turn the shaft 18 to move the rack bars. The indicators 20 and 20$^a$ are arranged with their long axes parallel with each other and parallel with the long axes of the plates 8, and it will be evident that when the shaft 18 is oscillated in either direction the four indicators 8 and 20 and 20$^a$ will be swung simultaneously in the same direction.

It will be noticed from an inspection of Figs. 3 and 4, that the shaft 18 is polygonal in cross section to prevent rotation of the shaft and pinion with respect to each other, and a cotter pin 21 is provided for limiting the movement of the shaft in one direction, the movement in the other direction being limited by an indicator 20 or 20$^a$.

The operation of the improvement is as follows:—

Normally the parts stand in the position shown in Fig. 1, and when the driver intends to turn to the right for instance, he will oscillate the shaft 18 by swinging the adjacent indicator 20 to the right. This will cause the pinion 17 to move the connected rack bars to the left, and the indicators 8 will be swung to the right, so that the representation of the index fingers will both point to the right. If the driver intends to turn to the left he will swing the adjacent indicators 20 or 20$^a$ to the left, and the indicators 8 will be moved to cause the index fingers to point toward the left.

For night use, signal lamps are arranged in the index finger on each indicator. These lights 22 are electric lights, four in number, and the globes are differently colored. The bulbs or globes are preferably colored white, red, blue and green, and these lights are so arranged with respect to their supplying circuit and switch mechanism operated by the movement of the indicators that the different colored globes will be ignited in accordance with the movement of the indicators.

As will be seen the lamps are supplied with current by a circuit consisting of lead wires 23 and 24, the said wires being connected with a suitable source of electrical energy, as for instance, a battery or the like. Each signal is as before stated, insulated from the support 2—3, by means of the sleeve 16, and the said sleeve has a flange 25 at its rear end, and a switch plate 26 at its front end. The washer or flange 25 insulates the nut 15 from the adjacent face of the portion 3, while the plate 26 insulates the indicator 8 and the nut 15 adjacent thereto.

This plate and flange are of insulating material, as for instance, hard rubber, and a metallic contact button 27 is arranged on the plate 26, near the lower end thereof. This button is adapted to contact with four other buttons, indicated at 28 on the rear face of the indicator, and the said buttons 28 are connected with the respective lamps 22, in such manner that when any one button 28 is in contact with the button 27, the circuit will be completed through the lamp connected with the button and the lamp will be illuminated.

The lamps are colored, as before stated, red, white, blue and green, and these lights are so arranged that they will be ignited at various positions of the indicators 8 and 20. As for instance, the blue might indicate an intention to stop, the red to turn in one direction, as for instance, the right, the green might indicate the intention to turn to the left, and the white the intention to go straight ahead. The arrangement of the lights will of course depend upon the wishes of the user.

The device may be arranged as shown in Fig. 1 with the wind shield elevated or it may be arranged as shown in Fig. 7 with the wind shield down or reversed. The shaft 18 is made reversible as shown in Figs. 3 and 4. In Fig. 3 the parts are shown in the position of Fig. 1, while in Fig. 4 the parts are shown in the position of Fig. 7.

When the operator intends to turn the wind shield down he will remove the cotter pin 21, which limits the longitudinal movement of the shaft in one direction and will move the shaft longitudinally until the cotter pin can be placed in the other opening 29.

With the parts in the position of Fig. 1 the indicator 20$^a$ is adjacent to the operator or driver, and he grasps this indicator to turn the shaft 18. With the parts turned down in the position of Fig. 7, it is the indicator 20 that he grasps and he will move the shaft 18 longitudinally until the indicator 20$^a$ is adjacent to the extension 19. The turning down of the wind shield simply reverses the signal supporting mechanism and the signals, so that in the neutral position the indicators point directly downward instead of directly upward.

It will be understood that a suitable source of energy is connected with the wires 23 and 24, and suitable cut out switches are provided for permitting the lamps to be cut into and out of the circuit. It will be evident that the signal mechanism and the supporting mechanism being detachable may be arranged at any desired point in the height of the shield, and the device may be reversed when it is desirable for any purpose.

If desired the mechanism might be arranged at the rear, or similar mechanism might be arranged at this point. The indicators 8 are however, supported at a height and sufficiently far out laterally that they are clearly visible from behind as well as from in front. The lamps 22 are preferably arranged in openings extending transversely of the plates 8, so that they are visible from behind as well as from in front. When the wind shield is turned down, the only change required in the signaling mechanism is the movement of the shaft 18 longitudinally, to bring the indicator 20$^a$ adjacent to the extension 19, and to move the indicator 20 away from the extension 19$^a$.

The signals as arranged, are in a very conspicuous position, easily seen from any direction, and the device, as a whole, may be attached to or detached from any part of the vehicle. The two signals are operated simultaneously, and the vehicle is not encumbered with unnecessary weight or bulk. Furthermore the device is not unsightly nor is it in the way in any manner of the driver or the passengers. In addition the operator does not need to see the signals to know that they are properly placed.

The indicator 20 or 20$^a$ which is adjacent to him, and which he grasps to operate the other signals is positively connected to the signals 8 in such manner that they cannot move relatively angularly with respect to each other. The signal adjacent to the driver is thus a positive, sure and certain indication of the position of the signals that are displayed.

The placing of the device on the wind shield does not interfere in any way with the operation of the shield nor does it interfere in any way with the outlook of the driver. The operator with the improved signal is left free to use both hands in controlling the vehicle for the signals once set will remain in this position until they are changed.

In Figs. 3 and 8 mechanism is shown for holding the indicators in adjusted position, so that they cannot be accidentally displaced. This mechanism is in the form of a boss 30, on the outer face of the extension 19, the said boss being of circular form and concentric with the opening through which the shaft 18 extends. This boss is provided with a series of diametrical grooves or recesses 31, each of which extends the full diameter of the boss opening at the periphery, and the said grooves or recesses are designed to receive the cotter pin 21.

A coil spring 32 encircles the shaft 18 between the indicator 20 and the extension 19$^a$, acting normally to hold the cotter pin 21 in engagement with the grooves or recesses. The mere act of turning the shaft 18 will release the cotter pin, but the spring 32 makes sufficient pressure to prevent accidental release. It will be evident that the boss may be arranged on either or both extensions. This however, is not necessary, since when the shaft 18 is moved longitudinally, the indicator itself will engage with the grooves and the spring will be between the cotter pin 21 and the extension 19$^a$.

It will be understood that the pointers or indicators 20 and 20$^a$ may be of varying size or shape, and suitably colored if desired and instead of being in the form of arrows they may assume other or unusual shapes if desired. These and other changes in detail may be made without departing from the spirit of my invention as defined by the appended claims.

I claim:—

1. A device of the character specified, comprising a supporting bar having at each end a U-shaped extension and provided with means for engaging the wind shield of an automobile to support the bar transversely thereof and with the U-shaped extensions at the opposite sides of the shield, a connecting bar, a rack bar mounted to slide in each U-shaped extension and having an extension at its inner end, a detachable connection between each extension and the adjacent end of the connecting bar, an indicator pivoted to the front face of each of the extensions, and normally standing in a vertical position, a pinion rigid with each indicator at the pivotal connection and engaging the adjacent rack bar, and means for moving the rack bars and the connecting bars in either direction to simultaneously swing the indicators in the same direction, said means comprising a shaft journaled in the supporting bar near one indicator and at the outer side of the adjacent wind shield engaging mechanism, a pinion secured to the shaft, said shaft having at each end a radially extending indicator, the indicators being parallel and being parallel with the first-named indicators, said shaft being movable longitudinally in its bearings and in the pinion to bring either indicator adjacent to the bar.

2. A device of the character specified, comprising a supporting bar having means for detachably engaging the ends of a wind shield, a rack bar having guided movement longitudinally of the supporting bar, an indicator pivoted to each end of the supporting bar and having a pinion rigid therewith and meshing with the rack bar, said indicators being similar and similarly arranged, a pinion journaled on the supporting bar and engaging the rack bar to move the same in opposite directions, a shaft for turning the pinion, said shaft being movable longitudinally in the pinion, and having at each end an indicator, said indicators being parallel and parallel with the long axes of the first-named signals.

3. A device of the character specified, comprising a supporting bar having means for detachably engaging a wind shield, an indicator pivoted to the bar at one end thereof and having a pinion rigid therewith, a pinion journaled on the supporting bar, a rack bar connecting the pinions, a shaft for turning the last-named pinion and having at each end an indicator arranged similarly to the first-named indicator, said shaft being movable longitudinally in the pinion.

WILLIAM CHAFFIN.